(12) United States Patent
Cao et al.

(10) Patent No.: US 10,234,970 B2
(45) Date of Patent: Mar. 19, 2019

(54) INTEGRATED TOUCH CONTROL DISPLAY PANEL AND TOUCH DISPLAY DEVICE

(71) Applicants: Shanghai Tianma Micro-electronics Co., Ltd., Shanghai (CN); Shanghai AVIC OPTO Electronics Co., Ltd., Shanghai (CN); Tianma Micro-electronics Co., Ltd., Shenzhen (CN)

(72) Inventors: Zhaokeng Cao, Shanghai (CN); Wantong Shao, Shanghai (CN); Gang Liu, Shanghai (CN)

(73) Assignees: Shanghai Tianma Micro-electronics Co., Ltd., Shanghai (CN); Shanghai AVIC OPTO Electronics Co., Ltd., Shanghai (CN); Tianma Micro-electronics Co., Ltd., Shenzhen (CN)

( * ) Notice: Subject to any disclaimer, the term of this patent is extended or adjusted under 35 U.S.C. 154(b) by 93 days.

(21) Appl. No.: 15/146,512

(22) Filed: May 4, 2016

(65) Prior Publication Data

US 2017/0160850 A1 Jun. 8, 2017

(30) Foreign Application Priority Data

Dec. 8, 2015 (CN) .......................... 2015 1 0897536

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04107* (2013.01)

(58) Field of Classification Search
CPC .................. G06F 3/0412; G06F 3/044; G06F 2203/04107
See application file for complete search history.

(56) References Cited

U.S. PATENT DOCUMENTS

| | | | |
|---|---|---|---|
| 2009/0284484 A1 | 11/2009 | Hwang et al. | |
| 2010/0220071 A1* | 9/2010 | Nishihara | G06F 3/0416 345/173 |
| 2012/0075218 A1* | 3/2012 | Lin | G06F 3/0418 345/173 |

(Continued)

FOREIGN PATENT DOCUMENTS

| | | |
|---|---|---|
| CN | 102419486 A | 4/2012 |
| CN | 103926727 A | 7/2014 |

(Continued)

*Primary Examiner* — Lixi C Simpson
(74) *Attorney, Agent, or Firm* — Anova Law Group, PLLC

(57) ABSTRACT

The present disclosure provides an integrated touch control display panel. The integrated touch control display panel includes a display region and a peripheral circuit region located on at least one side of the display region. The display region includes a plurality of stripe shaped touch control electrodes that extend in a first direction and are sequentially arranged in a second direction which intersects with the first direction. A shielding structure is formed at the boundary region between the touch control electrodes and the peripheral circuit region to shield the signal interference from the peripheral circuit region to the touch control electrodes.

17 Claims, 9 Drawing Sheets

(56) References Cited

U.S. PATENT DOCUMENTS

| | | | | |
|---|---|---|---|---|
| 2012/0087065 A1* | 4/2012 | Kim | ............ | G06F 1/1656 |
| | | | | 361/679.01 |
| 2013/0093706 A1* | 4/2013 | Kurasawa | ............ | G06F 3/0412 |
| | | | | 345/173 |
| 2014/0043288 A1* | 2/2014 | Kurasawa | ............ | G06F 3/0412 |
| | | | | 345/174 |
| 2015/0268795 A1* | 9/2015 | Kurasawa | ............ | G06F 3/0418 |
| | | | | 345/174 |
| 2015/0355767 A1* | 12/2015 | Abe | ............ | G06F 3/0412 |
| | | | | 345/174 |

FOREIGN PATENT DOCUMENTS

| | | |
|---|---|---|
| CN | 104461187 A | 3/2015 |
| CN | 205193763 U | 4/2016 |

* cited by examiner

INTEGRATED TOUCH CONTROL DISPLAY PANEL AND TOUCH DISPLAY DEVICE

CROSS-REFERENCES TO RELATED APPLICATIONS

This application claims the priority of Chinese Patent Application No. CN201510897536.2, filed on Dec. 8, 2015, the entire contents of which are incorporated herein by reference.

FIELD OF THE DISCLOSURE

The present disclosure generally relates to the touch control technologies and, more particularly, relates to an integrated touch control display panel and a touch display device.

BACKGROUND

As an input medium, a touch control display panel is by far the simplest and most convenient way for human machine interaction. Therefore, more and more products have incorporated touch control display functionalities into liquid crystal displays. Generally, a touch control display panel is divided into a display region for image display and touch control, and a peripheral circuit region located on at least one side of the display region. The display region usually includes a plurality of pixel units for image displaying function and a plurality of touch control electrodes for touch control function. The peripheral circuit region often includes a plurality of shift registers which include a plurality of transistors and at least one capacitor. Thus, the peripheral circuit region contains complex wiring structures which are likely to cause signal interference to the touch control electrodes in the display region and to affect touch control precision.

The disclosed integrated touch control display panel and touch display device are directed to solve one or more of above-stated problems in the art.

BRIEF SUMMARY OF THE DISCLOSURE

Directed to solve one or more problems set forth above and other problems in the art, the present disclosure provides an integrated touch control display panel and a touch display device.

One aspect of the present disclosure includes an integrated touch control display panel. The integrated touch control display panel includes a display region and a peripheral circuit region located on at least one side of the display region. The display region includes a plurality of stripe shaped touch control electrodes that extend in a first direction and are sequentially arranged in a second direction which intersects with the first direction. A shielding structure is formed at the boundary region between the touch control electrodes and the peripheral circuit region to shield the signal interference from the peripheral circuit region to the touch control electrodes.

Another aspect of the present disclosure includes a touch display device. The touch display device includes the disclosed integrated touch control display panel.

Other aspects of the present disclosure can be understood by those skilled in the art in light of the description, the claims, and the drawings of the present disclosure.

The integrated touch control display panel according to the present disclosure may reduce the signal interference from the peripheral circuit region to the touch control electrodes in the display region to achieve desirable touch control performance.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the present invention.

Figure 1:
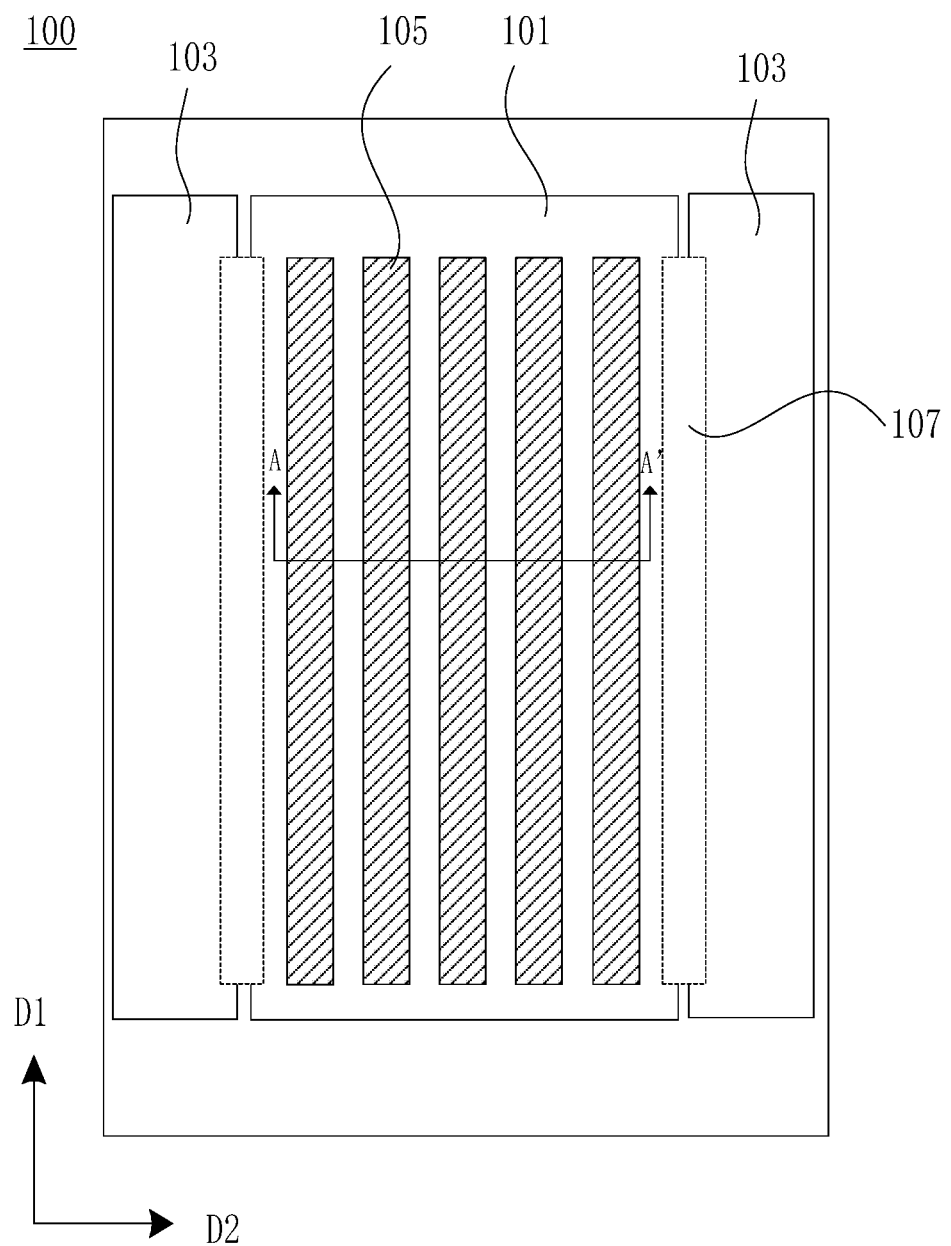
FIG. 1 illustrates a schematic view of an exemplary integrated touch control display panel according to the disclosed embodiments.

FIG. 1 illustrates a schematic view of an exemplary integrated touch control display panel according to the present disclosure. Referring to FIG. 1, the integrated touch control display panel 100 may include a display region 101 and a peripheral circuit region 103 located on at least one side of the display region 101. The display region 101 may include a plurality of stripe shaped touch control electrodes 105. The touch control electrodes 105 may extend in a first direction D1 and may be sequentially arranged in a second direction D2. The first direction D1 may intersect with the second direction D2. A shielding structure 107 may be configured at the boundary region between the touch control electrodes 105 and the peripheral circuit region 103.

The peripheral circuit region 103 may include a plurality of shift registers connected in series. The shift register may include a plurality of transistors and at least one capacitor. The peripheral circuit region 103 may include complex wiring structures, which may cause signal interference to the touch control electrodes 105 in the display region 101 and may affect touch control precision. The shielding structure 107 configured at the boundary region between the touch control electrodes 105 and the peripheral circuit region 103 may be used to shield the signal interference from the peripheral circuit region 103 to the touch control electrodes 105.

Figure 2:
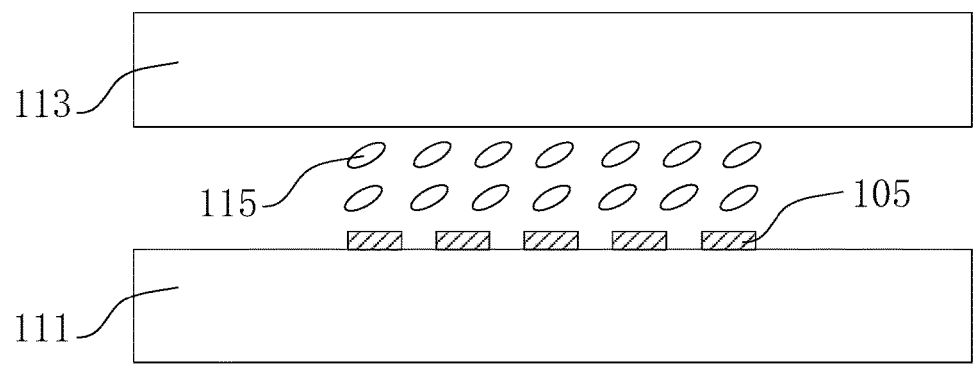
FIG. 2 illustrates a cross-sectional view along the AA' line in FIG. 1.

FIG. 2 illustrates a cross-sectional view along the AA' line in FIG. 1. Referring to FIGS. 1-2, the integrated touch control display panel 100 may include an array substrate 111 and a color film substrate 113 configured facing toward the array substrate 111.

The array substrate 111 may include a plurality of gate electrodes, gate electrodes scanning lines, source electrodes, drain electrodes, pixel electrodes connected to the drain electrodes, and a plurality of insulating layers configured between the metal electrodes and transparent metal electrodes. The electrodes may be in any appropriate structures, may be formed in any appropriate form or layers, and any appropriate interconnect may be used to connect or insulate the electrodes.

Further, the integrated touch control display panel 100 may include a common electrode layer. The common electrode layer may be made of a transparent conducting film, such as a layer of indium tin oxide (ITO). The common electrode layer may be divided into a plurality of stripe shaped electrodes 105 that are insulated from each other. The stripe shaped electrodes 105 may extend in the first direction D1 and may be sequentially arranged in the second direction D2. The liquid crystals 115 in the liquid crystal layer may block or pass light depending on the orientation. The liquid crystals 115 may be rotated by an electric field applied between a pixel electrode (not shown) and a common electrode 105. By rotating the liquid crystals, light may be blocked or passed for each pixel.

When the integrated touch control display panel 100 is performing image display function or during the image display phase, the stripe shaped electrodes 105 together with the pixel electrodes (not shown) may control the rotation of the liquid crystals 115 to display images. Further, when the integrated touch control display panel 100 is performing touch control function or during the touch control phase, the stripe shaped electrodes 105 shown in FIG. 2 may have functions equivalent to the touch control electrodes 105 shown in FIG. 1, such as receiving or sending touch control driving signals, and executing touch control function. That is, electrodes 105 are both the common electrodes for displaying images and the touch control electrodes for touch control.

Further, the integrated touch control display panel 100 may be configured in a capacitive touch control mode. The capacitive touch control mode may be divided into self capacitive touch control and mutual capacitive touch control. The mutual capacitive touch control may require two types of electrodes coupled with each other. One type of electrodes may be touch control driving electrodes. The other type of electrodes may be touch control detecting electrodes.

The touch control driving electrodes may be used to receive the driving signals transmitted from the integrated circuit, such as touch control IC. The touch control detecting electrodes may be capacitively coupled with the touch control driving electrodes to sense touch control and to feed the sensed signals back to the integrated circuit or touch control IC. The touch control IC may then determine the position information and other information based on the sensed signals.

The touch control driving electrodes and the touch control detecting electrodes may intersect with each other in the touch control display panel. For example, one type of electrodes may be configured on the array substrate, and the other type of electrodes may be configured on the color film substrate. Alternatively, one type of the electrodes may be configured inside the touch control display panel, and the other type of electrodes may be configured outside the touch control display panel. The type of electrodes inside the touch control display panel may be configured on either the array substrate or the color film substrate. More variations of configurations of the touch control driving electrode and the touch control detecting electrode configurations may also be used.

Figure 3:
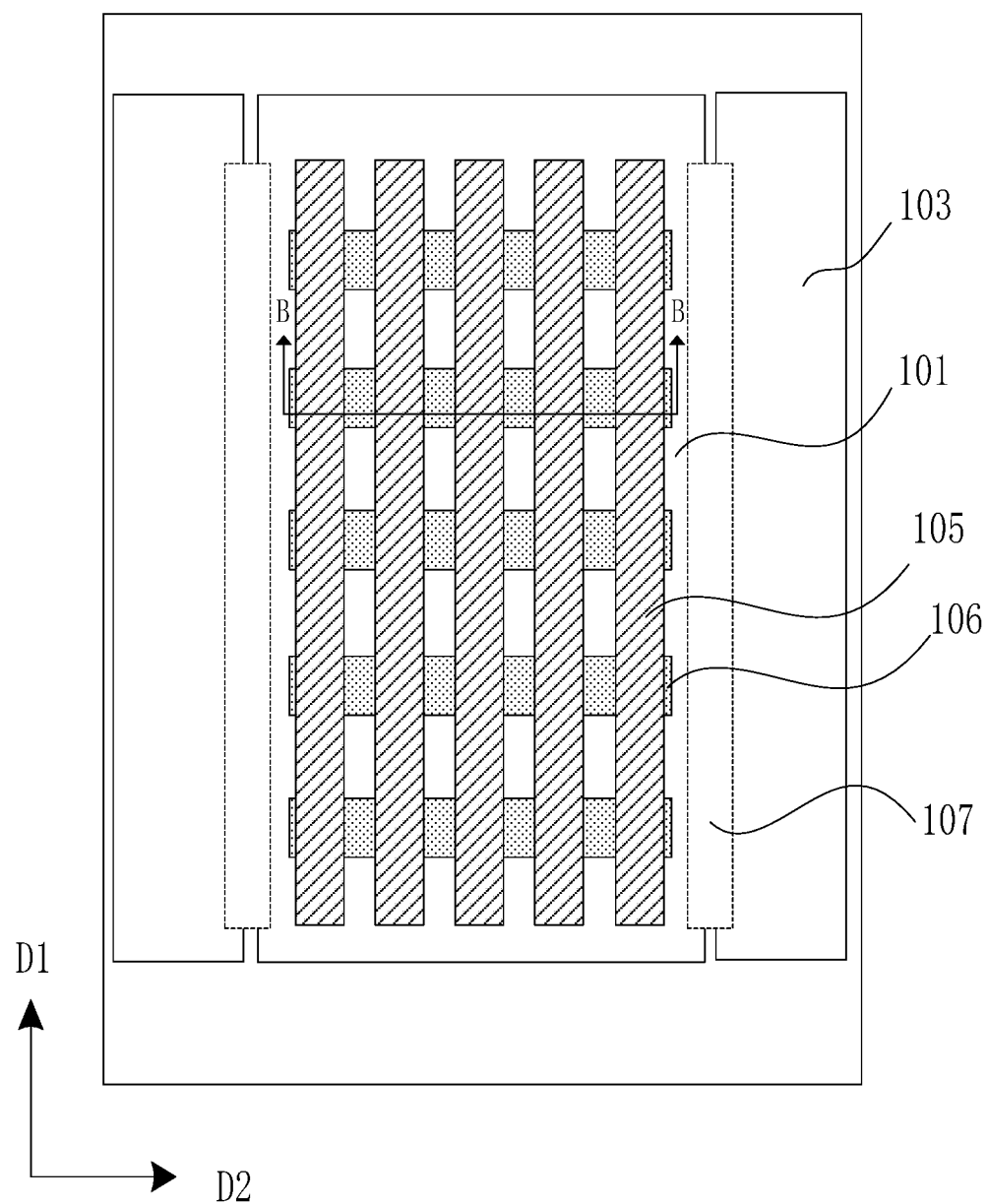
FIG. 3 illustrates a schematic view of another exemplary integrated touch control display panel according to the disclosed embodiments.
Figure 4:
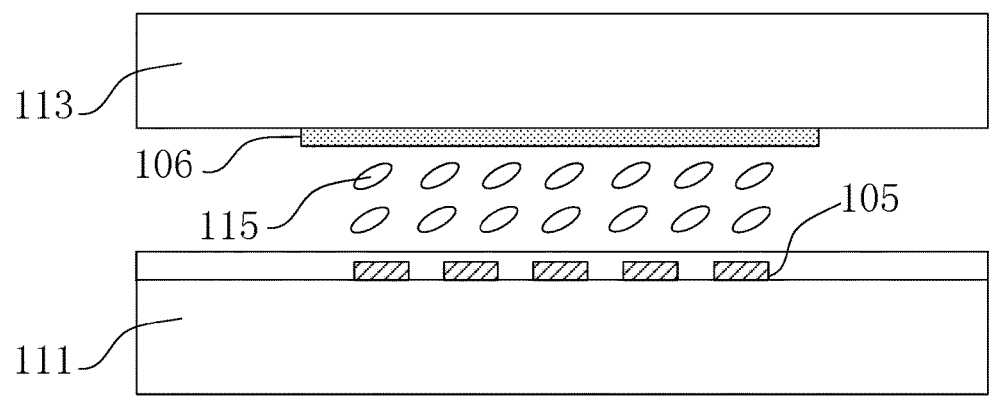
FIG. 4 illustrates a cross-sectional view along the BB' line in FIG. 3.

FIG. 3 illustrates a schematic view of another exemplary integrated touch control display panel according to the present disclosure. FIG. 4 illustrates a cross-sectional view along the BB' line in FIG. 3. FIGS. 3-4 are similar to FIGS. 1-2 and use the same labels from FIGS. 1-2.

Referring to FIG. 3, the touch control display panel 100 may include a display region 101 and a peripheral circuit region 103 on both sides of the display region 101. The display region 101 may include a plurality of stripe shaped touch control electrodes 105. The touch control electrodes 105 may extend in a first direction D1 and may be sequentially arranged in a second direction D2. The first direction D1 may intersect with the second direction D2. In addition, FIGS. 3-4 show the electrodes 106 configured facing toward the touch control electrodes 105.

Specifically, referring to FIGS. 3-4, the stripe shaped electrodes 105 may perform a multiplexed function of the touch control driving electrodes. In this case, the other electrodes 106 that intersect with the stripe shaped electrodes 105 may perform a multiplexed function of the touch control detecting electrodes. Alternatively, the stripe shaped electrodes 105 may perform a multiplexed function of the touch control detecting electrodes. In this case, the other electrodes 106 that intersect with the stripe shaped electrodes 105 may perform a multiplexed function of the touch control driving electrodes.

Referring to FIG. 4, the stripe shaped electrodes 105 may be configured on the array substrate 111 and the other electrodes 106 may be configured on the color film substrate 113. Further, referring to FIG. 3, the stripe shaped electrodes 105 may extend in the first direction D1 and may be sequentially arranged in parallel in the second direction D2. The other electrodes 106 may extend in the second direction D2 and may be sequentially arranged in parallel in the first direction Dl. However, other configurations may also be used.

For example, the stripe shaped electrodes 105 may extend in the second direction D2 and may be sequentially arranged in parallel in the first direction. At the same time, the other electrodes 106 may extend in the first direction and may be sequentially arranged in parallel in the second direction D2 as long as the stripe shaped electrodes 105 and the other electrodes 106 intersect with each other. Further, the specific layering sequence of the stripe shaped electrodes 105 and the other electrodes 106 may be configured differently and is not intended to be limiting.

Figure 5:
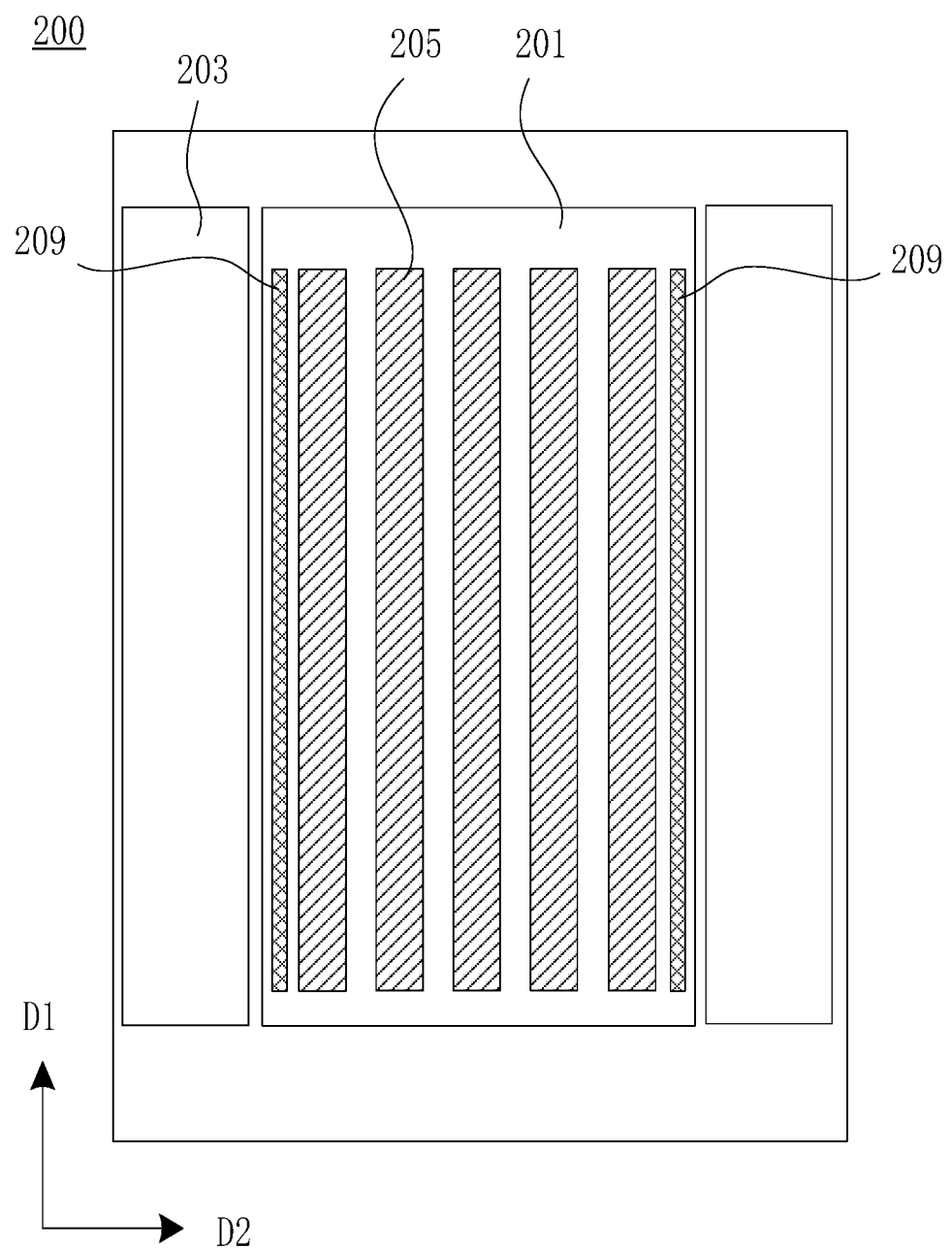
FIG. 5 illustrates a schematic view of another exemplary integrated touch control display panel according to the disclosed embodiments.

FIG. 5 illustrates a schematic view of another exemplary integrated touch control display panel according to the present disclosure. Referring to FIG. 5, the integrated touch control display panel 200 may include a display region 201 and a peripheral circuit region 203 located on at least one side of the display region 201. The display region 201 may include a plurality of stripe shaped common/touch control electrodes 205. The touch control electrodes 205 may extend in the first direction D1 and may be sequentially arranged in the second direction D2. The first direction D1 may intersect with the second direction D2.

In addition, a plurality of first electrodes 209 may be configured at the boundary regions between the touch control electrodes 205 and the peripheral circuit region 203. The first electrodes 209 may be in the shape of stripe and may extend in the first direction D1. The first electrodes 209 may be located at the boundary regions between the stripe shaped touch control electrodes 205 and the peripheral circuit region 203. That is, a single first electrode 209 or multiple first electrodes 209 may be placed between the touch control electrodes 205 and the peripheral circuit region 203.

Figure 6:
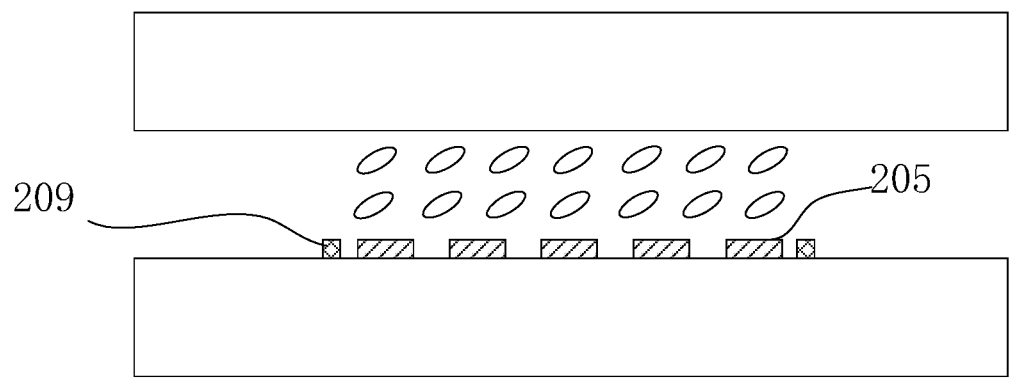
FIG. 6 illustrates a schematic view of an exemplary film structure of an integrated touch control display panel according to the disclosed embodiments.

FIG. 6 illustrates a schematic view of an exemplary film structure of an integrated touch control display panel according to the present disclosure. Referring to FIG. 6, the first electrodes 209 and the touch control electrodes 205 may be coplanar with each other, and may be formed in a single step of the fabrication process. For example, the touch control electrodes 205 may perform a multiplexed function of the common electrodes, and may be formed with transparent metal electrode material such as ITO. Similar to the touch control electrodes 205, the first electrodes 209 may be formed by the same step of the fabrication process using the same ITO material. Thus, the fabrication process is simplified and the fabrication cost is reduced.

Further, as shown in FIGS. 3-4, the touch control electrodes may be the touch control driving electrodes to couple with the touch control detecting electrodes. Alternatively, the touch control electrodes may be the touch control detecting electrodes to couple with the touch control driving electrodes. For example, the touch control electrodes 205 may perform a multiplexed function of the touch control driving electrodes, and may receive the touch control signals transmitted from the integrated circuit or touch control IC.

Similar to the touch control electrodes 205, the first electrodes 209 may also receive the same touch control driving signals from the touch control IC. However, in addition to receiving the touch control signals from the touch control IC, the touch control electrodes 205 may also capacitively couple with the corresponding touch control detecting electrodes. The touch control detecting electrodes may send the coupling signals which reflect the coupling capacitance back to the integrated circuit or touch control IC.

In the integrated touch control display panel according to the present disclosure, no touch control detecting electrodes may be configured to couple with the first electrodes 209. That is, the first electrodes 209 may only perform dummy scans. Such configuration may allow the first electrodes 209 to shield the signal interference from the peripheral circuit region 203 to the touch control electrodes 205 in the display region 201. Further, such configuration may make the two touch control electrodes 205 located on the outermost edges perform the same multiplexed function of the touch control electrodes 205 in the middle of the display region 201, with the desired effect of background noise reduction.

Further, the shielding structure of the integrated touch control display panel according to the present disclosure may provide the most effective shielding function to the touch control electrodes 205 located on the outermost edges of the display region 201, i.e., the two stripe shaped touch control electrodes 205 on the left and right edges of the display region 201.

In one embodiment, the first electrodes 209 may be connected to ground. Such configuration may make the voltage of the touch control electrodes 205 located at the outermost edge remain unaffected, and may subsequently reduce the signal interference from the peripheral circuit region 203.

In another embodiment, the peripheral circuit region 203 may include a system bus sub-region (not shown) and a TFT component sub-region (not shown). The system bus sub-region may include a first bus line (not shown) that supplies a constant high voltage, and a second bus line (not shown) that supplies a constant low voltage. The first electrodes 209 may be electrically connected to either the first bus line or the second bus line to shield the signal interference from the peripheral circuit region 203.

In another embodiment, similar to FIG. 5, the first electrodes 209 and the touch control electrodes 205 may be formed in the same layer and may be made of a metallic material. The first electrodes 209 may be connected to a constant voltage or ground. Because the first electrodes 209 are made of a metallic material, the voltage shielding effect may not be compromised by external interferences.

In another embodiment, other configurations may be adopted. Generally, the touch control display panel may include a gate metal electrode layer (not shown) and a source/drain electrode metal layer (not shown). The gate electrode metal layer may be etched to form gate electrode lines and gate electrodes. The source/drain electrode metal layer may be etched to form source electrodes and drain electrodes. The three electrodes of the gate electrodes, the source electrodes and the drain electrodes together may form a plurality of thin film transistors (not shown) that control pixel light emission.

Figure 7:
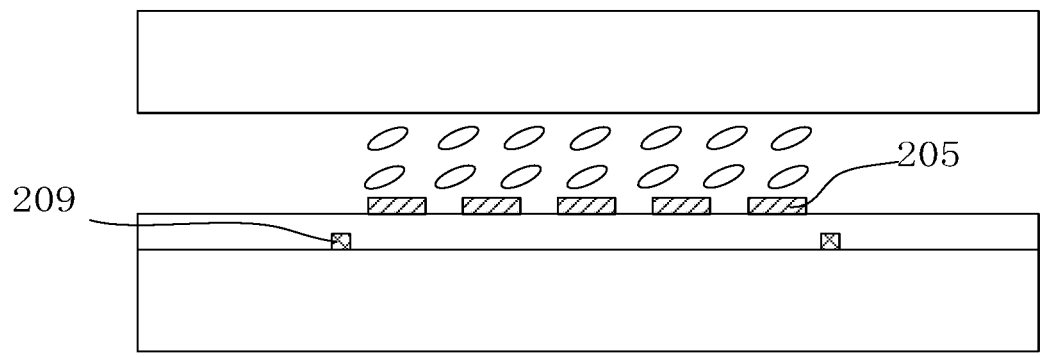
FIG. 7 illustrates a schematic view of another exemplary integrated touch control display panel according to the disclosed embodiments.

The first electrodes 209 may be formed in a layer different from the touch control electrodes 205. FIG. 7 illustrates a schematic view of another exemplary integrated touch control display panel according to the present disclosure. Referring to FIG. 7, the first electrodes 209, the gate electrode lines (not shown) and the gate electrodes (not shown) may be formed with the same metallic material in the same layer by the same step of the fabrication process. Alternatively, the first electrodes 209, the source electrodes (not shown) and the drain electrodes (not shown) may be formed with the same metallic material in the same layer by the same step of the fabrication process. The first electrodes 209 may be connected to a constant voltage or no voltage. Because the first electrodes 209 are made of metallic material, the voltage shielding effect may not be compromised by external interferences. At the same time, such configuration may save cost as compared to separately formed metallic shielding electrodes.

Figure 8:
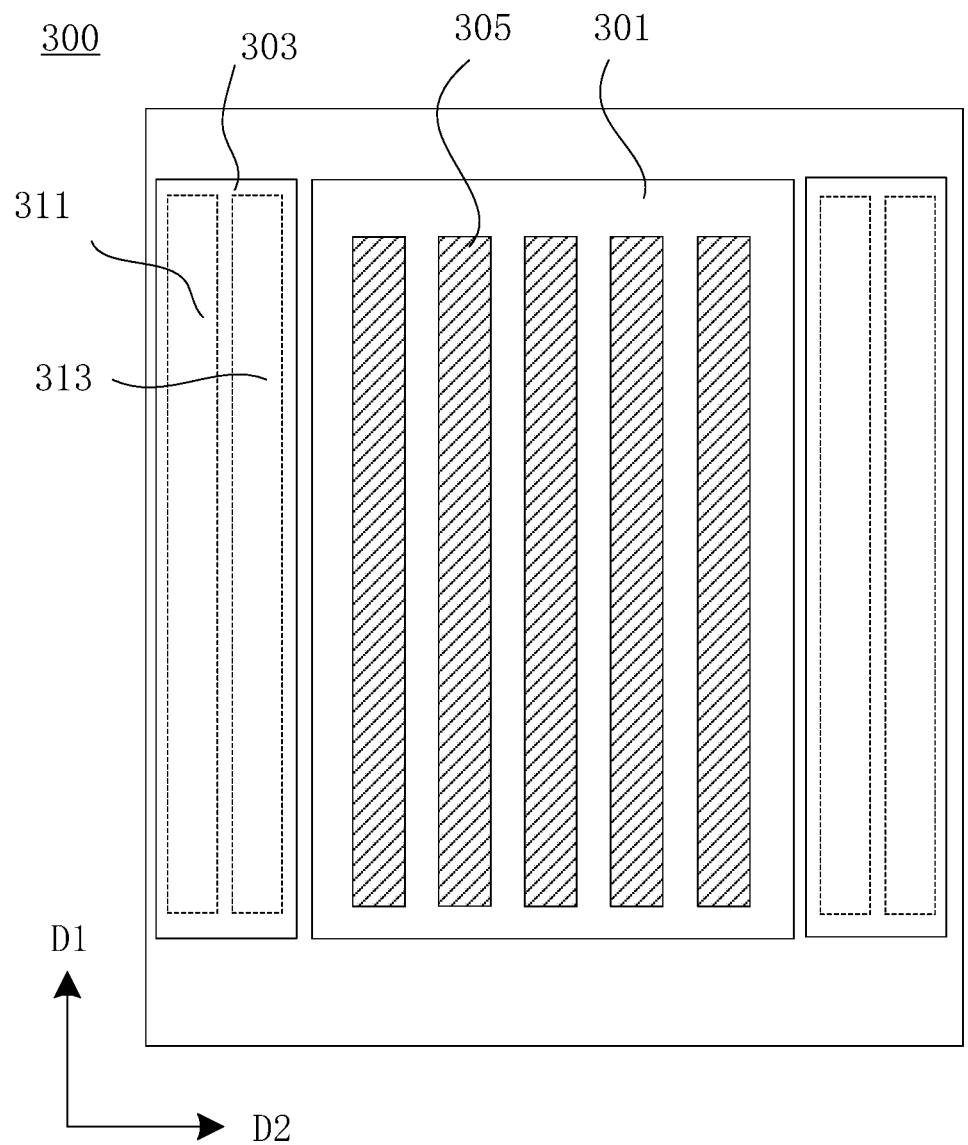
FIG. 8 illustrates a schematic view of another exemplary integrated touch control display panel according to the disclosed embodiments.

FIG. 8 illustrates a schematic view of another exemplary integrated touch control display panel according to the present disclosure. Referring to FIG. 8, the integrated touch control display panel 300 may include a display region 301 and a peripheral circuit region 303 located on at least one side of the display region 301. The display region 301 may include a plurality of stripe shaped common/touch control electrodes 305. The touch control electrodes 305 may extend in the first direction D1 and may be sequentially arranged in the second direction D2. The first direction D1 may intersect with the second direction D2. The peripheral circuit region 303 may include a system bus sub-region 313 and a TFT component sub-region 311. The system bus sub-region 313 may be located between the touch control electrodes 305 and the peripheral circuit region 303.

The system bus sub-region 313 may include a first bus line (not shown) that supplies a constant high voltage and a second bus line that supplies a constant low voltage. The first bus line and/or the second bus line may form the shielding structure. Both the first bus line and the second bus line may be supplied with constant voltages. Such configuration may have the advantage of using the circuit structure already existed in the peripheral circuit region 303 without adding new shielding circuits, achieving the shielding effect, and narrowing the display panel bezel at the same time.

Figure 9:
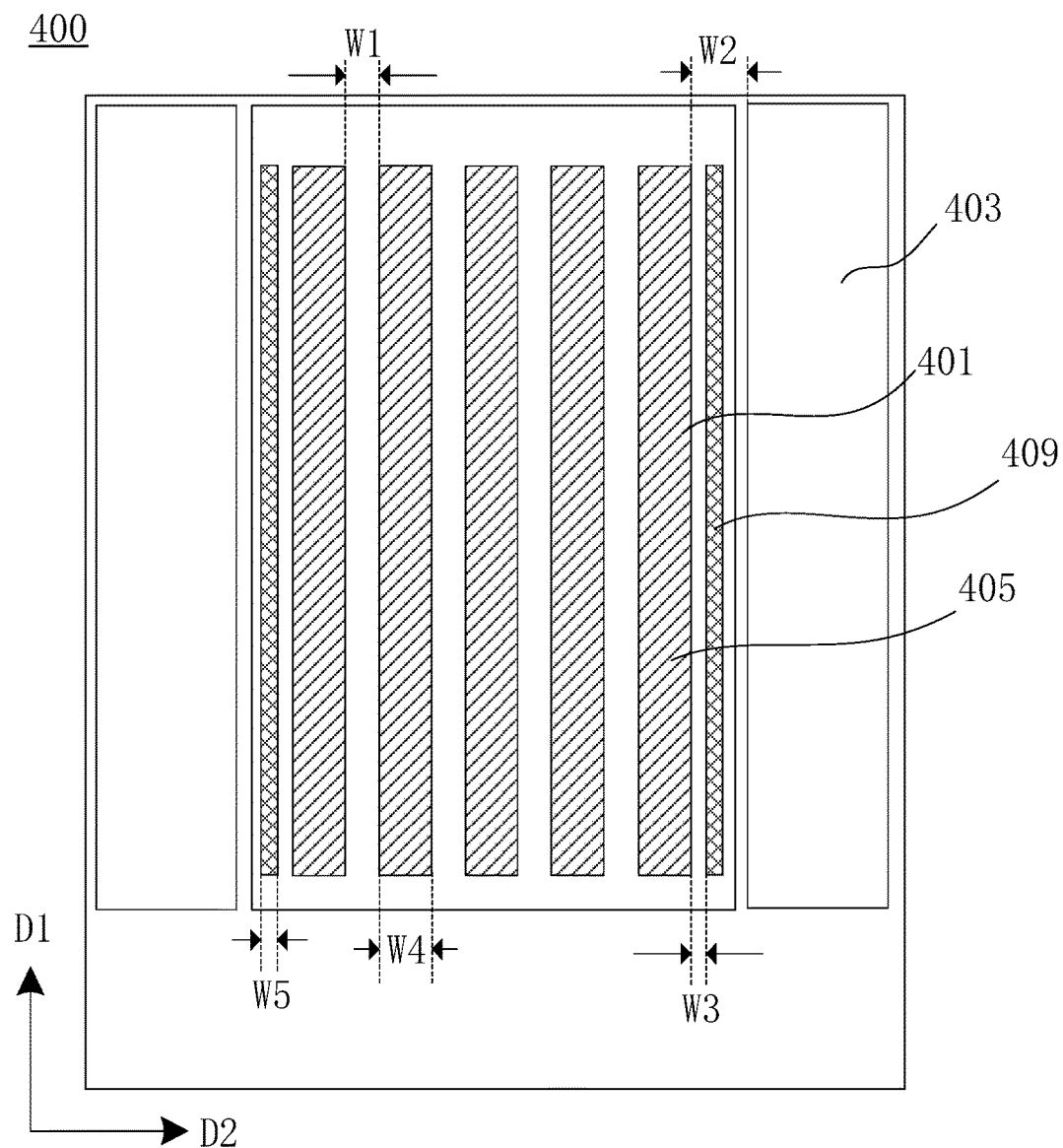
FIG. 9 illustrates a schematic view of another exemplary integrated touch control display panel according to the disclosed embodiments.

FIG. 9 illustrates a schematic view of another exemplary integrated touch control display panel according to the present disclosure. Referring to FIG. 9, the integrated touch control display panel 400 may include a display region 401 and a peripheral circuit region 403 located on at least one side of the display region 401. The display region 401 may include a plurality of stripe shaped common/touch control electrodes 405. The touch control electrodes 405 may extend in the first direction D1 and may be sequentially arranged in the second direction D2. The first direction D1 and the second direction D2 may intersect with each other. A plurality of first electrodes 409 may be formed at the boundary regions between the touch control electrodes 405 and the peripheral circuit region 403. The first electrodes 409 may be stripe shaped electrodes that extend in the first direction D1. The first electrodes 409 may be located between the stripe shaped touch control electrodes 405 and the peripheral circuit region 403.

Specifically, the gap between two adjacent touch control electrodes 405 in the second direction D2 may be a first width W1. The gap between the peripheral circuit region 403 and the nearest touch control electrodes 405 in the second direction D2 may be a second width W2. The gap between the first electrodes 409 and the nearest touch control electrodes 405 in the second direction D2 may be a third width W3. The width of any touch control electrodes 405 in the second direction D2 may be a fourth width W4. The width of any first electrodes 409 in the second direction D2 may be a fifth width W5.

Figure 10:
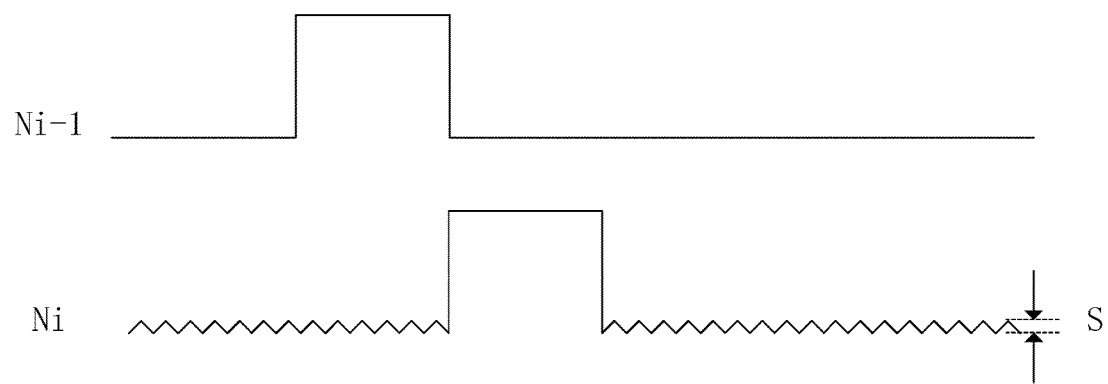
FIG. 10 illustrates a schematic view of signal interference to the touch control signals caused by the peripheral circuit region of the integrated touch control display panel according to the disclosed embodiments.

FIG. 10 illustrates a schematic view of signal interference to the touch control signals caused by the peripheral circuit region of the integrated touch control display panel according to the present disclosure. Referring to FIG. 10, the signals $N_{i-1}$ and $N_i$ of two touch control electrodes or of two types of touch control electrodes may be used for illustration purpose. The signal $N_{i-1}$ may be touch control signals from inner touch control electrodes that are farther to the peripheral circuit region, and the signal $N_{i-1}$ may be stable and may have no ripples. That is, the inner touch control electrodes with the signal $N_{i-1}$ may be considered as free of signal interference from the peripheral circuit region.

The signal $N_i$ may be touch control signals from outer touch control electrodes that are closer to the peripheral circuit region, and the signal $N_i$ may have ripples. That is, the outer touch control electrodes with the signal $N_i$ may be considered as having signal interference from the peripheral circuit region. The ripple ratio may be called S. The ripple ratio S may be defined as the ratio of the amplitude of the ripples to the amplitude of the signal. The touch control electrode with signal $N_i$ may be affected by the signal interference from the peripheral circuit region.

Table 1 illustrates the relationship between the various dimensions of the peripheral circuit region and the signal interference intensities to the touch control electrodes in absence of the shielding structure.

TABLE 1

Relationship between various peripheral circuit region dimensions and touch control electrode signal interference intensities in absence of shielding structure

| W1 (μm) | W2 (μm) | W3 (μm) | W4 (μm) | W5 (μm) | S |
|---|---|---|---|---|---|
| 6 | 8 | 0 | 2.57 × 1000 | 0 | 0.39% |
| 6 | 10 | 0 | 2.57 × 1000 | 0 | 0.35% |
| 6 | 20 | 0 | 2.57 × 1000 | 0 | 0.34% |
| 6 | 40 | 0 | 2.57 × 1000 | 0 | 0.31% |

From FIGS. 9-10 and Table 1, it can be observed that, in absence of the first electrodes 409 (W5=0 and W3=0), and when the first width W1=6 μm and the second width W2=8 μm or 10 μm or 20 μ or 40 μm, respectively, the ripple ratio S of the signal interference received by the touch control electrodes from the peripheral circuit region may be 0.39%, 0.35%, 0.34% and 0.31%, respectively. Based on the operating principle of the touch control display panel, when the ripple ratio S is approximately smaller than or equal to 0.3%, the touch control display panel may have a desirable capability of recognizing touch control positions quickly and precisely. In addition, when the ripple ratio S is gradually reducing, the touch control display panel may be able to recognize touch control positions more quickly and more precisely. When the ripple ratio S is approximately smaller than or equal to 0.2%, the signal interference to the touch control electrodes from the peripheral circuit region may be negligible, and the touch control performance may be optimal.

In Table 1, when the first width W1=6 μm and the second width W2=40 μm, the ripple ratio S is 0.31%, which is very close to 0.3%. In this case, the integrated touch control display panel may have a touch control position recognition capability that is substantially improved from the conventional touch control display panel. However, such design may still have the obvious disadvantage of lacking narrow bezel.

TABLE 2

Relationship between various peripheral circuit region dimensions and touch control electrode signal interference intensities in presence of shielding structure

| W1 (μm) | W2 (μm) | W3 (μm) | W4 (μm) | W5 (μm) | S |
|---|---|---|---|---|---|
| 6 | 8 | 2.5 | 2.57 × 1000 | 3 | 0.19% |
| 6 | 10 | 3.5 | 2.57 × 1000 | 3 | 0.22% |
| 6 | 20 | 8.5 | 2.57 × 1000 | 3 | 0.30% |

In Table 2, the width of the first electrode W5=3 μm is used for illustration purpose to describe the relationship between the peripheral circuit region dimension and the signal interference intensities in presence of the shielding structure. From Table 1 and Table 2, it can be observed that when the shielding structure is formed between the stripe shaped touch control electrodes and the peripheral circuit region, the ripple ratio S may be substantially reduced. When the gap W3 between the shielding structure and the touch control electrodes in the second direction D2 is greater than or equal to 2.5 μm and smaller than or equal to 8.5 μm, the touch control display panel may have the desired capability of recognizing touch control positions quickly and precisely.

Further, when the first width W1=6 μm, the second width W2=8 μm, the third width W3=2.5 μm, the fourth width W4=2.57×1000 μm, and the fifth width W5=3 μm, the ripple ratio may reach 0.19%. In this case, the signal interference from the peripheral circuit region to the touch control electrodes may be negligible, and the touch control performance may be optimal.

TABLE 3

Relationship between various peripheral circuit region dimensions and touch control electrode signal interference intensities in presence of shielding structure

| W1 (μm) | W2 (μm) | W3 (μm) | W4 (μm) | W5 (μm) | S |
|---|---|---|---|---|---|
| 6 | 9 | 2.5 | 2.57 × 1000 | 4 | 0.18% |
| 6 | 11 | 3.5 | 2.57 × 1000 | 4 | 0.21% |
| 6 | 21 | 8.5 | 2.57 × 1000 | 4 | 0.30% |

In Table 3, the width of the first electrode W5=4 μm is used for illustration purpose to describe the relationship between the peripheral circuit region dimension and the signal interference intensities in presence of the shielding structure. From Table 1 and Table 3, it can be observed that when the shielding structure is formed between the stripe shaped touch control electrodes and the peripheral circuit region, the ripple ratio S may be substantially reduced. When the gap W3 between the shielding structure and the touch control electrodes in the second direction D2 is approximately greater than or equal to 2.5 μm and smaller than or equal to 8.5 μm, the touch control display panel may have the desired capability of recognizing touch control positions quickly and precisely. Further, when the first width W1=6 μm, the second width W2=9 μm, the third width W3=2.5 μm, the fourth width W4=2.57×1000 μm, and the fifth width W5=4 μm, the ripple ratio may reach 0.18%. In this case, the signal interference from the peripheral circuit region to the touch control electrodes may be negligible, and the touch control performance may be optimal.

TABLE 4

Relationship between various peripheral circuit region dimensions and touch control electrode signal interference intensities in presence of shielding structure

| W1 (μm) | W2 (μm) | W3 (μm) | W4 (μm) | W5 (μm) | S |
|---|---|---|---|---|---|
| 6 | 11 | 2.5 | 2.57 × 1000 | 6 | 0.18% |
| 6 | 13 | 3.5 | 2.57 × 1000 | 6 | 0.21% |
| 6 | 25 | 8.5 | 2.57 × 1000 | 6 | 0.29% |

In Table 4, the width of the first electrode W5=6 μm is used for illustration purpose to describe the relationship between the peripheral circuit region dimension and the signal interference intensities in presence of the shielding structure. From Table 1 and Table 4, it can be observed that when the shielding structure is formed between the stripe shaped touch control electrodes and the peripheral circuit region, the ripple ratio S may be substantially reduced. When the gap W3 between the shielding structure and the touch control electrodes in the second direction D2 is approximately greater than or equal to 2.5 μm and smaller than or equal to 8.5 μm, the touch control display panel may have the desired capability of recognizing touch control positions quickly and precisely. Further, when the first width W1=6 μm, the second width W2=11 μm, the third width W3=2.5 μm, the fourth width W4=2.57×1000 μm, and the fifth width W5=6 μm, the ripple ratio may reach 0.18%. In this case, the signal interference from the peripheral circuit region to the touch control electrodes may be negligible, and the touch control performance may be optimal.

The data sets given in Tables 1-4 including the W1-W5 dimensions may be used only for illustration purpose to describe the relationship between the peripheral circuit dimensions and the touch control electrode signal interference intensities. However the data sets are not intended to be limiting. The specific dimensions may be altered for different models of different products. As long as the shielding structure is present between the touch control electrodes and the peripheral circuit region, the signal interference may be shielded and substantially reduced. Further, when the gap W3 between the shielding structure and the touch control electrodes in the second direction D2 is approximately greater than or equal to 2.5 μm and smaller than or equal to 8.5 μm, the signal interference from the peripheral circuit region to the touch control electrodes may be negligible, and the touch control performance may be optimal.

In one embedment, the shielding structure may be the first electrodes 409, as shown in FIG. 9. In conjunction with the data sets given in Tables 1-4, FIG. 9 may be used for illustration purpose to describe the effects with and without the shielding structure. However, such effects may not be limited to the configuration of the first electrodes 409 as shown in FIG. 9.

Further, in other embodiments, FIG. 8 may be used to describe the effects with and without the shielding structure. In this case, the peripheral circuit region 303 may include the system bus sub-region 313 and the TFT component sub-region 311. The system bus sub-region 313 may be located between the touch control electrodes 305 and the peripheral circuit region 303. The system bus sub-region 313 may include the first bus line that supplies the constant high voltage and the second bus line that supplies the constant low voltage. The first bus line and/or the second bus line may form the shielding structure. In this case, the data sets given in Tables 1-4 may also be applicable.

Specifically, the peripheral circuit region of the integrated touch control display panel in the various embodiments may be defined in the following. The region between any type of metal lines or components in the non-display region on both sides of the integrated touch control display panel and the outermost edges of the non-display region may be called the peripheral circuit region. Further, the first direction D1 in various embodiments may be the extension direction of the data lines in the integrated touch control display panel. The second direction D2 in various embodiments may be the extension direction of the gate electrode scanning lines in the integrated touch control display panel.

Figure 11:
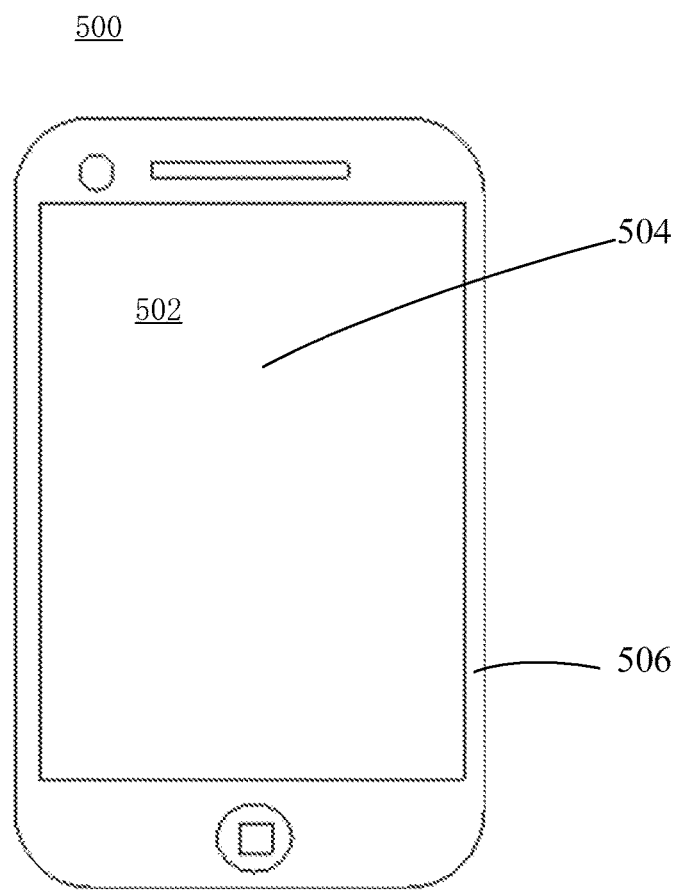
FIG. 11 illustrates a schematic view of an exemplary touch display device according to the disclosed embodiments.

FIG. 11 illustrates a schematic view of an exemplary touch display device according to the present disclosure. Referring to FIG. 11, the touch display device 500 may be a smart phone. The touch display device may include an integrated touch control display panel 502. The integrated touch control display panel may include a display region 504 and a peripheral circuit region 506 located on at least one side of the display region 504.

The touch display device 500 may also include a camera, a home button, a speaker, a microphone, a CPU, memories, and other appropriate components (not shown). The integrated touch control display panel according to the present disclosure may reduce the signal interference from the peripheral circuit region to the touch control electrodes in the display region to achieve desirable touch control performance.

The touch display device 500 may also be a computer display, or other devices with touch display screens. Specifically, such touch display device may include the integrated touch control display panel according to the present disclosure.

Various embodiments have been described to illustrate the operation principles and exemplary implementations. The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. An integrated touch control display panel, comprising:
a substrate and an opposite substrate configured facing toward the substrate;
a display region;
a peripheral circuit region located on both sides of the display region;
a plurality of data lines extending in a first direction; and
a plurality of gate electrode scanning lines extending in a second direction which intersects with the first direction,
wherein:
an inner surface of the substrate is facing toward an inner surface of the opposite substrate;
the display region includes a plurality of stripe shaped touch control electrodes that extend in the first direction and are sequentially arranged in the second direction;
the plurality of stripe shaped touch control electrodes are disposed on the inner surface of the substrate to perform a multiplexed function of common electrodes;
a shielding structure is formed at a boundary region between the plurality of stripe shaped touch control electrodes and the peripheral circuit region, and is configured to shield a signal interference from the peripheral circuit region to the plurality of stripe shaped touch control electrodes disposed in the display region;
the shielding structure includes a first electrode, the first electrode is a stripe shaped electrode that extends in the first direction, and the first electrode is located at the boundary region between the plurality of stripe shaped touch control electrodes and the peripheral circuit region; and
a width of the first electrode in the second direction is smaller than or equal to a gap width between adjacent stripe shaped touch control electrodes in the second direction.

2. The integrated touch control display panel of claim 1, wherein:
the integrated touch control display panel includes a common electrode layer;
the common electrode layer is divided into a plurality of stripe shaped common electrodes that are insulated from each other;
the stripe shaped common electrodes extend in the first direction and are sequentially arranged in the second direction; and
the stripe shaped common electrodes perform the multiplexed function of the stripe shaped touch control electrodes.

3. The integrated touch control display panel of claim 2, wherein:
the stripe shaped electrodes perform a multiplexed function of touch control driving electrodes; and
the integrated touch control display panel also includes touch control detecting electrodes that intersect with the touch control driving electrodes.

4. The integrated touch control display panel of claim 2, wherein:
the stripe shaped electrodes perform a multiplexed function of touch control detecting electrodes; and
the integrated touch control display panel also includes touch control driving electrodes that intersect with the touch control detecting electrodes.

5. The integrated touch control display panel of claim 1, wherein:
the first electrode and the plurality of stripe shaped touch control electrodes are formed in a same layer by a same step of the fabrication process.

6. The integrated touch control display panel of claim 5, wherein:
the first electrode and the plurality of stripe shaped touch control electrodes receive a same driving signal or the first electrode is electrically connected to ground during a touch control phase.

7. The integrated touch control display panel of claim 1 wherein:
the first electrode and the plurality of stripe shaped touch control electrodes are formed in a same layer and are made of a same metallic material.

8. The integrated touch control display panel of claim 1, wherein:
the integrated touch control display panel includes a gate electrode metallic layer and a source/drain electrode metallic layer;
the gate electrode metallic layer is etched to form the gate electrode scanning lines and gate electrodes;
the source/drain metallic layer is etched to form source electrodes and drain electrodes; and
the gate electrodes, the source electrodes and the drain electrodes together form thin film transistors used to control pixel light emission.

9. The integrated touch control display panel of claim 8, wherein:
the first electrode, the gate electrode scanning lines and the gate electrodes are formed in a same layer by a same step of fabrication process.

10. The integrated touch control display panel of claim 8, wherein:
the first electrode, the source electrodes and the drain electrodes are formed in a same layer by a same step of fabrication process.

11. The integrated touch control display panel of claim 8, wherein:
the first electrode is supplied with a constant voltage or are connected to ground.

12. The integrated touch control display panel of claim 1, wherein:
the peripheral circuit region includes a system bus sub-region and a TFT component sub-region;
the system bus sub-region is located on a side of the peripheral circuit region adjacent to the plurality of stripe shaped touch control electrodes;
the system bus sub-region includes a first bus line that supplies a constant high voltage and a second bus line that supplies a constant low voltage; and
the shielding structure includes the us line and/or the second bus line.

13. The integrated touch control display panel of claim 12, wherein:
a gap between the first bus line and a nearest stripe shaped touch control electrode in the second direction or a gap between the second bus line and a nearest stripe shaped touch control electrode in the second direction is approximately greater than or equal to 2.5 μm and smaller than or equal to 8.5 μm.

14. The integrated touch control display panel of claim 1, wherein:
a gap between the first electrode and a nearest stripe shaped touch control electrode in the second direction is approximately greater than or equal to 2.5 μm and smaller than or equal to 8.5 μm.

15. The integrated touch control display panel of claim 1, wherein:
the peripheral circuit region includes a system bus sub-region and a TFT component sub-region;
the system bus sub-region includes a first bus line that supplies a constant high voltage and a second bus line that supplies a constant low voltage; and
the first electrode is electrically connected to the first bus line or the second bus line.

16. A touch display device including an integrated touch control display panel, the integrated touch control display panel comprising:
a substrate and an opposite substrate configured facing toward the substrate;
a display region;
a peripheral circuit region located on both sides of the display region;
a plurality of data lines extending in a first direction; and
a plurality of gate electrode scanning lines extending in a second direction which intersects with the first direction,
wherein:
an inner surface of the substrate is facing toward an inner surface of the opposite substrate;
the display region includes a plurality of stripe shaped touch control electrodes that extend in the first direction and are sequentially arranged in the second direction;
the plurality of stripe shaped touch control electrodes are disposed on the inner surface of the substrate to perform a multiplexed function of common electrodes;
a shielding structure is formed at a boundary region between the plurality of stripe shaped touch control electrodes and the peripheral circuit region, and is configured to shield a signal interference from the peripheral circuit region to the plurality of stripe shaped touch control electrodes disposed in the display region;
the shielding structure includes a first electrode, the first electrode is a stripe shaped electrode that extends in the first direction, and the first electrode is located at the boundary region between the plurality of stripe shaped touch control electrodes and the peripheral circuit region; and
a width of the first electrode in the second direction is smaller than or equal to a gap width between adjacent stripe shaped touch control electrodes in the second direction.

17. An integrated touch control display panel, comprising:
a display region; and
a peripheral circuit region located on both sides of the display region,
wherein:
the display region includes a plurality of stripe shaped touch control electrodes that extend in a first direction and are sequentially arranged in a second direction which intersects with the first direction;
a shielding structure is formed at a boundary region between the plurality of stripe shaped touch control electrodes and the peripheral circuit region, and is configured to shield a signal interference from the peripheral circuit region to the plurality of stripe shaped touch control electrodes disposed in the display region;
the shielding structure includes a first electrode completely disposed in the display region; and
a width of the first electrode in the second direction is smaller than or equal to a gap width between adjacent stripe shaped touch control electrodes in the second direction.

* * * * *